(12) United States Patent
Ishida et al.

(10) Patent No.: US 10,073,217 B2
(45) Date of Patent: Sep. 11, 2018

(54) MULTICORE OPTICAL FIBER AND METHOD FOR MANUFACTURING MULTICORE OPTICAL FIBER

(71) Applicant: FUJIKURA LTD., Tokyo (JP)

(72) Inventors: Itaru Ishida, Sakura (JP); Shoichiro Matsuo, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/324,027

(22) PCT Filed: Jan. 29, 2016

(86) PCT No.: PCT/JP2016/052643
§ 371 (c)(1),
(2) Date: Jan. 5, 2017

(87) PCT Pub. No.: WO2016/157978
PCT Pub. Date: Oct. 6, 2016

(65) Prior Publication Data
US 2017/0205575 A1 Jul. 20, 2017

(30) Foreign Application Priority Data
Mar. 30, 2015 (JP) .................................. 2015-070099

(51) Int. Cl.
*G02B 6/02* (2006.01)
*C03B 37/027* (2006.01)
*G02B 6/036* (2006.01)

(52) U.S. Cl.
CPC ........ *G02B 6/02042* (2013.01); *C03B 37/027* (2013.01); *G02B 6/036* (2013.01)

(58) Field of Classification Search
CPC ....... G02B 6/02; G02B 6/036; G02B 6/02042
(Continued)

(56) References Cited

U.S. PATENT DOCUMENTS 4,925,269 A * 5/1990 Scrivener .............. G02F 1/3131
385/126
7,102,700 B1 * 9/2006 Pease ................... H04N 9/3129
348/744

(Continued)

FOREIGN PATENT DOCUMENTS

| JP | 2001-208923 A | 8/2001 |
| JP | 2013-513131 A | 4/2013 |
| JP | 2013-228548 A | 11/2013 |

OTHER PUBLICATIONS

International Search Report dated May 10, 2016, issued in counterpart of International Application No. PCT/JP2016/052643 (2 pages).

(Continued)

*Primary Examiner* — Kaveh C Kianni
(74) *Attorney, Agent, or Firm* — Westerman, Hattori, Daniels & Adrian, LLP

(57) ABSTRACT

A multicore optical fiber (1) includes a plurality of cores (11 to 16) and a cladding (20) surrounding the outer circumferential surfaces of the cores (11 to 16). In the plurality of cores of the multicore optical fiber (1), a skew value (S) between a pair of cores is expressed by a predetermined expression. The multicore optical fiber (1) is bent in a specific bending direction, in which in all of the combinations of the pairs of cores in the plurality of cores, the pair of cores has the maximum absolute value of the skew value found by the expression and the skew value of the pair of cores is a minimum value.

4 Claims, 12 Drawing Sheets

(58) Field of Classification Search
USPC .......................................................... 385/126
See application file for complete search history.

(56) References Cited

U.S. PATENT DOCUMENTS

| | | | | |
|---|---|---|---|---|
| 7,174,078 B2* | 2/2007 | Libori | ................ | G02B 6/02042 385/123 |
| 2002/0176677 A1* | 11/2002 | Kumar | .............. | C03B 37/01222 385/126 |
| 2005/0281522 A1* | 12/2005 | Kim | ................... | G02B 6/02328 385/125 |
| 2009/0154503 A1* | 6/2009 | Peyghambarian | ...... | H01S 3/067 372/6 |
| 2011/0052129 A1* | 3/2011 | Sasaoka | ............ | G02B 6/02042 385/126 |
| 2011/0129190 A1 | 6/2011 | Fini et al. | | |
| 2011/0188855 A1* | 8/2011 | Kokubun | .......... | G02B 6/02042 398/43 |
| 2011/0274398 A1* | 11/2011 | Fini | .................... | G02B 6/02042 385/124 |
| 2012/0069347 A1 | 3/2012 | Klein et al. | | |
| 2013/0156393 A1* | 6/2013 | Kokubun | ........... | G02B 6/02042 385/126 |
| 2013/0287347 A1* | 10/2013 | Taru | ................... | G02B 6/02042 385/100 |
| 2014/0119694 A1* | 5/2014 | Abedin | .............. | G02B 6/02042 385/43 |
| 2014/0178024 A1* | 6/2014 | Takenaga | .......... | G02B 6/02042 385/126 |
| 2014/0199039 A1* | 7/2014 | Kokubun | .......... | G02B 6/02042 385/126 |
| 2016/0033719 A1* | 2/2016 | Chen | ................. | G02B 6/02042 385/126 |
| 2016/0245989 A1* | 8/2016 | Suzuki | .............. | G02B 6/02009 |

OTHER PUBLICATIONS

Office Action dated Nov. 1, 2016, issued in counterpart of Japanese Patent Application No. 2015-070099 (3 pages).
Decision to Grant a Patent dated Oct. 3, 2017, issued in counterpart Japanese application No. 2015-070099, with English Translation. (6 pages).
Written Opinion of International Searching Authority issued in counterpart PCT/JP2016/052643.

* cited by examiner

MULTICORE OPTICAL FIBER AND METHOD FOR MANUFACTURING MULTICORE OPTICAL FIBER

TECHNICAL FIELD

The present invention relates to a multicore optical fiber that can reduce skew, which is preferable to the case in which a multicore optical fiber is nonlinearly installed.

BACKGROUND ART

In optical fiber communication systems, in order to increase the volume of information transmittable through one optical fiber, it is known that using a multicore optical fiber including a plurality of cores and a cladding surrounding the outer circumferential surfaces of the plurality of cores, a plurality of signals is transmitted by light beams propagating through the cores.

However, in the multicore optical fiber, it is known that a group differential delay occurs between cores, i.e. skew occurs. Patent Literature 1 below describes a multicore optical fiber that reduces such skew. In this multicore optical fiber, cores adjacent to each other have the different propagation constants, and the skew between signal light beams propagating through a plurality of cores is 1 ps/m or less.

[Patent Literature 1] JP-A-2013-228548

SUMMARY OF INVENTION

However, in the case in which a multicore optical fiber is installed, the multicore optical fiber is typically installed being bent. In the case in which the multicore optical fiber is bent as described above, its skew is sometimes degraded when the propagation constants of the cores adjacent to each other are different like the multicore optical fiber described in Patent Literature 1.

Therefore, an object of the present invention is to provide a multicore optical fiber and a method for manufacturing a multicore optical fiber that can reduce the degradation in skew even in the case in which the multicore optical fiber is nonlinearly installed.

An aspect of a multicore optical fiber according to the present invention is a multicore optical fiber including a plurality of cores and a cladding surrounding outer circumferential surfaces of the cores, and the multicore optical fiber includes the following characteristics.

In other words, the plurality of cores is straight when the cladding is straight. In the plurality of cores, a skew value S between a pair of cores is expressed by an expression below. In all of combinations of the pairs of cores in the plurality of cores, the multicore optical fiber is bent in a specific bending direction in which the pair of cores has a maximum absolute value of the skew value S and the skew value S of the pair of cores is a minimum value.

$$S = \frac{L}{c}\left[(N_{1m} - N_{1n}) + \frac{F}{R_b}(G_m - G_n) + \frac{1}{R_b}(G_m N_{1m} - G_n N_{1n}) + \frac{F}{R_b^2}(G_m^2 - G_n^2)\right]$$

$$F = -B_2 C_{12} - B_1(C_{12} + C_{11})$$

$$G_i = x_i \cos\theta - y_i \sin\theta$$

$$C_{11} = E(1-v)/[(1+v)(1-2v)]$$

$$C_{12} = Ev/[(1+v)(1-2v)]$$

where, i is m or n, and when an axis from a center of the cladding in a predetermined radial direction is defined as an x-axis and a radial direction orthogonal to the x-axis is defined as a y-axis, $\theta$ is an angle formed by a bending direction and the x-axis, $(x_m, y_m)$ are coordinates of a first core of the pair of cores, $(x_n, y_n)$ are coordinates of a second core of the pair of cores, L is a length of the multicore optical fiber, c is a velocity of light in a vacuum, $N_{1m}$ is a group refractive index of the first core of the pair of cores, $N_{1n}$ is a group refractive index of the second, core of the pair of cores, $R_b$ is a bending radius, $B_1$ is a photoelastic coefficient of the core to an ordinary ray, $B_2$ is a photoelastic coefficient of the core to an extraordinary ray, E is Young's modulus of core, and v is Poisson's ratio of core.

According to the expression, a skew value can be found for each of all of the combinations of pairs of cores with the multicore optical fiber being bent. Moreover, from the expression, a skew value having the maximum absolute value can be found in the skew values, and a bending direction, in which the skew value is a minimum value, can be found by calculation. The multicore optical fiber according to the present invention is bent in the bending direction, allowing the degradation in skew to be reduced. Accordingly, optical communications with small skew can be conducted.

Further, preferably, the multicore optical fiber is easily bent in the specific bending direction.

The multicore optical fiber is easily bent in the direction, in which the maximum value of the skew is a minimum value. Thus, the multicore optical fiber can be bent in the direction without so much paying attention to the bending direction of the multicore optical fiber.

Further, a mark is preferably provided in the specific bending direction.

Such a mark is provided. Thus, which direction the multicore optical fiber has to be bent can be easily grasped in installing the multicore optical fiber.

Preferably, when the mark is provided in this way, the mark is located in the cladding, and is a marker having a refractive index different from a refractive index of the cladding.

Another aspect of a multicore optical fiber according to the present invention is a multicore optical fiber including a plurality of cores and a cladding surrounding outer circumferential surfaces of the cores, and the multicore optical fiber includes the following characteristics.

In other words, the plurality of cores is continuously and spirally rotated about a center axis of the cladding at an angle in a range of $\theta_1$ to $\theta_2$ with a relative position of the plurality of cores being unchanged. In the plurality of cores, a skew value S between a pair of cores is expressed by an expression below. In all of combinations of the pairs of cores in the plurality of cores, the multicore optical fiber is bent in a specific bending direction in which the pair of cores has a maximum absolute value of the skew Value S and the skew value S of the pair of cores is a minimum value.

$$S = \frac{L}{c}\left[(N_{1m} - N_{1n}) + \frac{F}{R_b(\theta_2 - \theta_1)}\int_{\theta_1}^{\theta_2}(G_m - G_n)d\theta + \right.$$

-continued $$\frac{1}{R_b(\theta_2 - \theta_1)} \int_{\theta_1}^{\theta_2} (G_m N_{1m} - G_n N_{1n}) d\theta +$$

$$\frac{F}{R_b^2(\theta_2 - \theta_1)} \int_{\theta_1}^{\theta_2} (G_m^2 - G_n^2) d\theta \Bigg]$$

$$F = -B_2 C_{12} - B_1(C_{12} + C_{11})$$

$$G_i = x_i \cos\theta - y_i \sin\theta$$

$$C_{11} = E(1-\nu)/[(1+\nu)(1-2\nu)]$$

$$C_{12} = E\nu/[(1+\nu)(1-2\nu)]$$

where a relation 0 degrees $\leq \theta_1 < \theta_2 < 360$ degrees is held, and i is m or n, and when an axis extending from a center of the cladding to a radial direction, on which a relative position of the plurality of cores is constant, along a longitudinal direction of the cladding, is defined as an x-axis, and an axis extending in a radial direction orthogonal to the x-axis is defined as a y-axis, $\theta$ is an angle formed by a bending direction and the x-axis and continuously changed at an angle in a range of $\theta_1$ to $\theta_2$ along a longitudinal direction of the cladding, $(x_m, y_m)$ are coordinates of a first core of the pair of cores, $(x_n, y_n)$ are coordinates of a second core of the pair of cores, L is a length of the multicore optical fiber, c is a velocity of light in a vacuum, $N_{1m}$ is a group refractive index of the first core of the pair of cores, $N_{1n}$ is a group refractive index of the second core of the pair of cores, $R_b$ is a bending radius, $B_1$ is a photoelastic coefficient of the core to an ordinary ray, $B_2$ is a photoelastic coefficient of the core to an extraordinary ray, E is Young's modulus of core, and $\upsilon$ is Poisson's ratio of core.

According to the expression, a skew value can be found for each of all of the combinations of pairs of cores with the multicore optical fiber being bent with twist at an angle in a range of 360 degrees. Moreover, from the expression, in the skew values, attention is focused on a skew value having the maximum absolute value, and a bending direction, in which the skew value is a minimum, value, can be found by calculation. The multicore optical fiber according to the present, invention can be bent in the bending direction. Thus, the degradation in skew can be reduced, and optical communications with small skew can be conducted.

An aspect of a method for manufacturing a multicore optical fiber according to the present invention is a method for manufacturing a multicore optical fiber including a plurality of cores and a cladding surrounding outer circumferential surfaces of the cores, and the method includes the following characteristics.

In other words, the method includes: calculating in which based on disposing positions of a plurality of core rods when the plurality of core rods to be the plurality of cores is disposed being surrounded by a cladding rod to be the cladding, a skew value S between a pair of cores is found by an expression below in the plurality of cores, in all of combinations of the pairs of cores in the plurality of cores, a specific bending direction in which the pair of cores has a maximum absolute value of the skew value S and the skew value S of the pair of cores is a minimum value is found; disposing the plurality of core rods at the disposing positions; and drawing a preform formed of the plurality of core rods disposed at the disposing positions and the cladding rod with no twist.

$$S = \frac{L}{c} \Bigg[ (N_{1m} - N_{1n}) + \frac{F}{R_b}(G_m - G_n) + \frac{1}{R_b}(G_m N_{1m} - G_n N_{1n}) + \frac{F}{R_b^2}(G_m^2 - G_n^2) \Bigg]$$

$$F = -B_2 C_{12} - B_1(C_{12} + C_{11})$$

$$G_i = x_i \cos\theta - y_i \sin\theta$$

$$C_{11} = E(1-\nu)/[(1+\nu)(1-2\nu)]$$

$$C_{12} = E\nu/[(1+\nu)(1-2\nu)]$$

where, i is m or n, and when an axis from a center of the cladding in a predetermined radial direction is defined as an x-axis and a radial direction orthogonal to the x-axis is defined as a y-axis, $\theta$ is an angle formed by a bending direction and the x-axis, $(x_m, y_m)$ are coordinates of a first core of the pair of cores, $(x_n, y_n)$ are coordinates of a second core of the pair of cores, L is a length of the multicore optical fiber, c is a velocity of light in a vacuum, $N_{1m}$ is a group refractive index of the first core of the pair of cores, $N_{1n}$ is a group refractive index of the second core of the pair of cores, $R_b$ is a bending radius, $B_1$ is a photoelastic coefficient of the core to an ordinary ray, $B_2$ is a photoelastic coefficient of the core to an extraordinary ray, E is Young's modulus of core, and $\upsilon$ is Poisson's ratio of core.

According to such a method for manufacturing a multicore optical fiber, a multicore optical fiber can be manufactured with the specific bending direction of the multicore optical fiber to be manufactured being grasped, in which the maximum value of the skews is a minimum value. Accordingly, a multicore optical fiber to be manufactured can be easily bent in the specific bending direction, and the degradation in skew can be reduced.

Further, the plurality of core rods is preferably disposed so that a magnitude of the skew value S is a minimum value with the multicore optical fiber being bent in the specific bending direction.

In the calculating, in addition to the specific bending direction, the skew value can be grasped with the multicore optical fiber being bent in the specific bending direction. Thus, a plurality of cores is disposed in such a manner that the skew value of the multicore optical fiber being bent is decreased. Accordingly, the skew value of a multicore optical fiber to be manufactured can be further reduced.

In the disposing, based on a center of the cladding rod, a marker having a refractive index different from a refractive index of the cladding in the specific bending direction is preferably disposed so that the marker is surrounded by the cladding rod.

Further, in the drawing, the preform is preferably disposed in a drawing furnace so that the specific bending direction found by the calculating is directed to a predetermined in direction.

In the drawing, the preform is disposed being directed to the direction. Thus, the bending direction of a multicore optical fiber to be manufactured can be easily grasped, in which the maximum absolute value of the skew value S is a minimum value.

Another aspect of a method for manufacturing at multicore optical fiber according to the present invention is a method for manufacturing a multicore optical fiber including a plurality of cores and a cladding surrounding outer circumferential surfaces of the cores, and the method includes the following characteristics.

In other words, the method includes: calculating in which based on disposing positions of a plurality of core rods when the plurality of core rods to be the plurality of cores is disposed being surrounded by a cladding rod to be the cladding, a skew value S between a pair of cores is found by an expression below in the plurality of cores, in all of combinations of the pairs of cores in the plurality of cores, a specific bending direction in which the pair of cores has a maximum absolute value of the skew value S and the skew value S of the pair of cores is a minimum value is found; disposing the plurality of core rods at the disposing positions; and drawing a preform formed of the plurality of core rods disposed at the disposing positions and the cladding rod while continuously twisting the perform at an angle in a range of $\theta_1$ to $\theta_2$.

$$S = \frac{L}{c}\left[(N_{1m} - N_{1n}) + \frac{F}{R_b(\theta_2 - \theta_1)}\int_{\theta_1}^{\theta_2}(G_m - G_n)d\theta + \right.$$
$$\frac{1}{R_b(\theta_2 - \theta_1)}\int_{\theta_1}^{\theta_2}(G_m N_{1m} - G_n N_{1n})d\theta +$$
$$\left.\frac{F}{R_b^2(\theta_2 - \theta_1)}\int_{\theta_1}^{\theta_2}(G_m^2 - G_n^2)d\theta\right]$$

$F = -B_2 C_{12} - B_1(C_{12} + C_{11})$ $G_i = x_i \cos\theta - y_i \sin\theta$ $C_{11} = E(1 - v)/[(1 + v)(1 - 2v)]$ $C_{12} = Ev/[(1 + v)(1 - 2v)]$ where a relation 0 degrees≤$\theta_1$<$\theta_2$<360 degrees is held, and i is m or n, and when an axis extending from a center of the cladding to a radial direction, on which a relative position of the plurality of cores is constant along a longitudinal direction of the cladding, is defined as an x-axis and an axis extending in a radial direction orthogonal to the X-axis is defined as a y-axis, $\theta$ is an angle formed by a bending direction and the x-axis and continuously changed at an angle in a range of $\theta_1$ to $\theta_2$ along a longitudinal direction of the cladding, ($x_m$, $y_m$) are coordinates of a first core of the pair of cores, ($x_n$, $y_n$) are coordinates of a second core of the pair of cores, L is a length of the multicore optical fiber, c is a velocity of light in a vacuum, $N_{1m}$ is a group refractive index of the first core of the pair of cores, $N_{1n}$ is a group refractive index of the second core of the pair of cores, $R_b$ is a bending radius, $B_1$ is a photoelastic coefficient, of the core to an ordinary ray, $B_2$ is a photoelastic coefficient of the core to an extraordinary ray, E is Young's modulus of core, and $\upsilon$ is Poisson's ratio of core.

According to such a method for manufacturing a multicore optical fiber, the specific bending direction of a multicore optical fiber to be manufactured being twisted at an angle in a range of 360 degrees is grasped, in which the maximum value of the skews is a minimum value, and the multicore optical fiber can be manufactured. Accordingly, a multicore optical fiber to be manufactured can be easily bent in the specific bending direction, and the degradation in skew cap be reduced.

In this case, with the multicore optical fiber to be manufactured being bent in the specific bending direction, a distortion angle is preferably determined so that the pair of cores has a maximum absolute value of the skew value S and the skew value S of the pair of cores is a minimum value.

The multicore optical fiber is twisted in this range. Thus, skew can be further decreased in a multicore optical fiber to be manufactured.

As described above, according to the present invention, there are provided a multicore optical fiber and a method for manufacturing a multicore optical fiber that can reduce the degradation in skew even in the case in which the multicore optical fiber is nonlinearly installed.

DESCRIPTION OF EMBODIMENTS

Figure 1:
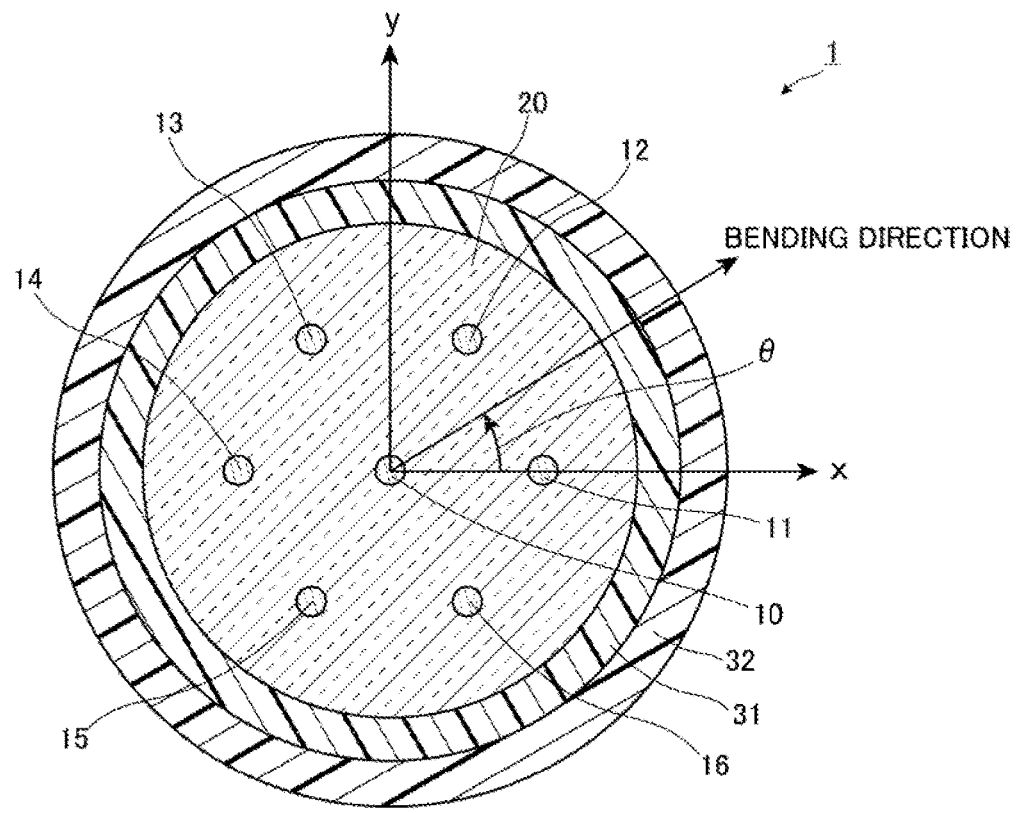
FIG. 1 is a diagram of a multicore optical fiber according to a first embodiment of the present invention.

In the following, preferred embodiments of a multicore optical fiber according to the present invention will be described in detail with reference to the drawings. Note that, for easy understanding, scales in the drawings are sometimes different from scales described in the following description.

First Embodiment

FIG. 1 is a diagram of a multicore optical fiber according to a first embodiment of the present invention. As illustrated in FIG. 1, a multicore optical fiber 1 according to the embodiment includes a plurality of cores 10 to 16, a cladding 20 surrounding the outer circumferential surfaces of the cores 10 to 16 with no gap, an inner protective layer 31 covering the outer circumferential surface of the cladding 20, and an outer protective layer 32 covering the outer circumferential surface of the inner protective layer 31.

In the embodiment, the number of the cores is seven overall. One core 10 is disposed along the center axis of the cladding 20, and the plurality of cores 11 to 16 is disposed around this core 10 at equal intervals. Thus, the center core 10 and the cores 11 to 16 on the outer circumferential side are disposed in triangular lattice shapes. Consequently, the inter-center pitches between the cores 10 to 16 are equal to each other. The plurality of cores 10 to 16 thus disposed has symmetry with respect to the center axis of the cladding 20. In other words, in the case in which the multicore optical fiber 1 is rotated about the center axis of the cladding 20, the positions of the cores 11 to 16 on the outer circumferential side after rotated are located at the position of the core 12 on the outer circumferential side before rotated. The core 10 disposed in the center is not moved even though the multicore optical fiber 1 is rotated about the center axis. As described above, the cores 10 to 16 are disposed at the positions in symmetry with respect to the center axis of the cladding 20. Thus, the optical properties of the cores 11 and 12 caused by the disposition can be made uniform. The plurality of cores 10 to 16 is straight in the case in which the cladding 20 is straight, because the multicore optical fiber 1 according to the embodiment is not twisted.

The sizes of the members configuring the multicore optical fiber 1 are not limited specifically. However, the diameter of the cladding 20 is 140 µm, for example. The outer diameter of the inner protective layer 31 is 205 µm, for example. The outer diameter of the outer protective layer 32 is 265 µm, for example. The inter-center pitch between the cores 11 and 12 is not limited specifically. However, it is 39 µm, for example.

In the embodiment, the propagation constants of the cores adjacent to each other are different from each other. For example, the diameters of the cores adjacent to each other are varied in a range of −5% to 5%, or the relative refractive index difference of the core to the cladding 20 is varied in a range of −5% to 5% between the cores adjacent to each other. As described above, even though the diameters of the cores adjacent to each other or the relative refractive index differences are slightly varied, for light, beams propagating through the cores 10 to 16, the states of the cores are not so ranch different, and the optical properties are almost the same. On the other hand, the diameters of the cores adjacent, to each other or the relative refractive index differences are slightly varied as described above. Thus, the crosstalk between the cores adjacent to each other can be reduced.

Next, a reduction in the skew of the multicore optical fiber 1 will be described.

A mode group delay t is expressed by Expression (1) below when the energy of an electromagnetic field is fully confined in the core, $$t = \frac{L}{c}\frac{d\beta}{dk} = \frac{L}{c}N_1 \quad (1)$$

where L is the length of the optical fiber, c is the velocity of light in a vacuum, β is the propagation constant of the core, k is a wave number of light in a vacuum, and $N_1$ is the group refractive index of the core.

Thus, in a typical single-core optical fiber, a skew value S between two optical fibers is expressed by Expression (2) below, $$S = t_i - t_j = \frac{L}{c}(N_{1i} - N_{1j}) \quad (2)$$

where the county delay of one of optical fibers is defined as $t_1$, the county delay of the other optical fiber is defined as $t_2$, the group refractive index of the core of the one optical fiber is defined as $N_{1i}$, and the group refractive index of the core of the other optical fiber is defined as $N_{1j}$.

Figure 2:
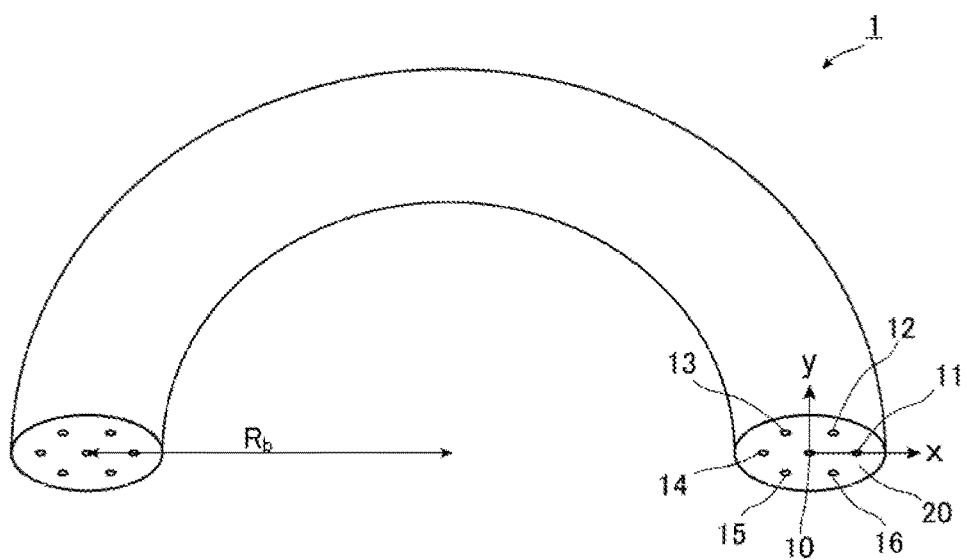
FIG. 2 is a diagram of the multicore optical fiber illustrated in FIG. 1, which is bent.

FIG. 2 is a diagram of the multicore optical fiber 1 illustrated in FIG. 1, which is bent. Note that, in FIG. 2, the inner protective layer 31 and the outer protective layer 32 are omitted. Here, as illustrated in FIG. 1, it is assumed that a predetermined radial direction from the center of the cladding 20 is defined as an x-axis, a radial direction orthogonal to the x-axis is defined as a y-axis, and an angle formed of a direction in which the multicore optical fiber is bent and the x-axis is defined as θ. Under the definition of the x-axis, the y-axis, and the angle θ as described above, in the case in which the multicore optical fiber 1 is bent as illustrated in FIG. 2, the angle θ is an angle of 180°.

In the case in which the multicore optical fiber 1 is bent as described above, an effective propagation constant $\beta'_m$ of a certain core m among the cores 10 to 16 is expressed by Expression (3) below, $$\beta'_m = \beta_m\left(1 + \frac{x_m\cos\theta - y_m\sin\theta}{R_b}\right) \quad (3)$$

where $\beta_m$ is the propagation constant of the core m, which is straight, $(x_m, y_m)$ are the coordinate position of the core m, and $R_b$ is the bending radius of the multicore optical fiber.

Thus, an effective group refractive index $N'_{1m}$ of the core m of the bent multicore optical fiber 1 is expressed by Expression (4) below from Expressions (1) and (3), $$N'_{1m} = \left(1 + \frac{x_m\cos\theta - y_m\sin\theta}{R_b}\right)N_{1m} \quad (4)$$

where the group refractive index of the core m is $N_{1m}$.

In other words, the skew between the core m and a certain core n, which is not the core m, of the bent multicore optical fiber 1, in which the bending radius, is constant, is expressed by Expression (5) below, $$S = t_m - t_n = \frac{L}{c}(N'_{1m} - N'_{1n}) \quad (5)$$
$$= \frac{L}{c}\left[(N_{1m} - N_{1n}) + \frac{N_{1m}(x_m\cos\theta - y_m\sin\theta) - N_{1n}(x_n\cos\theta - y_n\sin\theta)}{R_b}\right]$$

where $x_n$ and $y_n$ are the coordinate position of the core n, $N_{1n}$ is the group refractive index of the core n, and $N'_{1n}$ is the effective group refractive index of the core n.

The influence of a photoelastic effect, caused by bending stress is taken into account. In the case in which the multicore optical fiber 1 is bent, a variation $\Delta n_s$ in the refractive index of the core by photoelasticity caused by bending stress is expressed by Expression (6.1) below, $$\Delta n_s = n_s - n_1 = -B_2\sigma_x - B_1(\sigma_y + \sigma_z) \quad (6.1)$$

where $n_s$ is the refractive index of the core in the state in which stress is applied, $n_1$ is the refractive index of the core in the state in which the stress is not applied, $\sigma_x$, $\sigma_y$, and $\sigma_z$ are the levels of stress applied to the core in the x-axis direction, the y-axis direction, and the z-axis direction, respectively, where the z-axis is the longitudinal direction of the optical fiber, $B_1$ is the photoelastic coefficient, of the cores to an ordinary ray, and $B_2$ is the photoelastic coefficient of the cores to an extraordinary ray. Since $B_1$ and $B_2$ are the coefficients determined based on materials, these coefficients are not changed caused by the position or structure of the core. Thus, the coefficients $B_1$ and $B_2$ have the same value in any cores. Note that, in the case of silica, $B_1$ is $4.22 \times 10^{-6}$, and $B_2$ is $0.65 \times 10^{-6}$ [MPa$^{-1}$].

Here, Expression (6.1) above is rewritten based on the group refractive index, and then a variation $\Delta N_s$ of the group refractive index of the core is expressed by Expression (6.2) below. Here, the relationship $N = n - \lambda(dn/d\lambda)$ is held. However, the term $\lambda (dn/d\lambda)$ is ignored, because no problem is caused when ignored.

$$\Delta N_s = N_s - N_1 = -B_2\sigma_x - B_1(\sigma_y + \sigma_z) \tag{6.2}$$

Here, $\sigma_x$, $\sigma_y$, and $\sigma_z$ are expressed by Expression (7) below, $$\begin{bmatrix} \sigma_x \\ \sigma_y \\ \sigma_z \end{bmatrix} = \begin{bmatrix} C_{11} & C_{12} & C_{13} \\ C_{21} & C_{22} & C_{23} \\ C_{31} & C_{32} & C_{33} \end{bmatrix} \begin{bmatrix} \varepsilon_x \\ \varepsilon_y \\ \varepsilon_z \end{bmatrix} \tag{7}$$

where $\varepsilon_x$, $\varepsilon_y$, and $\varepsilon_z$ express the level of strain of the core in the x-axis direction, the y-axis direction, and the z-axis direction, respectively, caused by bending. The strain includes compression or elongation.

In the case of an isotropic medium like glass, the elastic constant tensor of the cores is expressed, by Expression blow, $$C_{11} = C_{22} = C_{33} = E(1-\upsilon)/[(1+\upsilon)(1-2\upsilon)]$$

$$C_{12} = C_{13} = C_{21} = C_{23}C_{31} = C_{32} = E\upsilon/[(1+\upsilon)(1-2\upsilon)]$$

where E is the Young's modulus of the core, and $\upsilon$ is the Poisson's ratio of the core. Note that, in the case of synthetic quartz glass, E is 76 GPa, and $\nu$ is 0.164.

In the case in which the multicore optical fiber is bent, strain in the x-axis direction and strain in the y-axis direction are as small as ignorable. Let us consider strain by elongation in the z-direction caused by bending the multicore optical fiber, where $\varepsilon_x$ and $\varepsilon_y$ are zero, $\varepsilon_z$ is expressed by Expression below, $$\varepsilon_z \Delta L/L = x/Rb$$

where L is the length of the core of the multicore optical fiber, which is straight, and $\Delta L$ is the elongation of the core by bending the multicore optical fiber.

Therefore, in the case in which the multicore optical fiber 1 is bent, $\varepsilon_z$ of the cores is expressed by Expression (8).

$$\varepsilon_z = \frac{x_m\cos\theta - y_m\sin\theta}{R_b} \tag{8}$$

Thus, from Expressions (7) and (8), in the case in which the multicore optical fiber 1 is bent, the level of stress applied to the core in each direction is expressed by Expression (9).

$$\sigma_x = \sigma_y = C_{12}\frac{x_m\cos\theta - y_m\sin\theta}{R_b} \quad \sigma_z = C_{11}\frac{x_m\cos\theta - y_m\sin\theta}{R_b} \tag{9}$$

Thus, from Expression (6), the refractive index variation caused by bending stress is expressed by Expression (10) below.

$$\Delta N_s \frac{x_m\cos\theta - y_m\sin\theta}{R_b}[-B_2 C_{12} - B_1(C_{12} + C_{11})] \tag{10}$$

From Expressions (4) and (10), an effective group refractive index $N''_{1m}$ of the core m taking into account of the photoelastic effect is expressed by Expression (11) below.

$$\begin{aligned} N''_{1m} &= \left(1 + \frac{x_m\cos\theta - y_m\sin\theta}{R_b}\right)(N_{1m} + \Delta N_s) \\ &= \left(1 + \frac{x_m\cos\theta - y_m\sin\theta}{R_b}\right) \\ &\quad \left(N_{1m} + \frac{x_m\cos\theta - y_m\sin\theta}{R_b}[-B_2 C_{12} - B_1(C_{12} + C_{11})]\right) \end{aligned} \tag{11}$$

Thus, a group delay $t_m$ of the core m of the multicore optical fiber 1 is expressed by Expression (12) below.

$$\begin{aligned} t_m &= \frac{L}{c}\left(1 + \frac{x_m\cos\theta - y_m\sin\theta}{R_b}\right) \\ &\quad \left(N_{1m} + \frac{x_m\cos\theta - y_m\sin\theta}{R_b}[-B_2 C_{12} - B_1(C_{12} + C_{11})]\right) \end{aligned} \tag{12}$$

Similar expressions are held for the core n. Thus, from Expressions (5) and (12), a skew value S between the cores m and n is expressed by Expression (13) below, where i is us or n.

$$\begin{aligned} S &= \frac{L}{c}\left[(N_{1m} - N_{1n}) + \frac{F}{R_b}(G_m - G_n) + \right. \\ &\quad \left. \frac{1}{R_b}(G_m N_{1m} - G_n N_{1n}) + \frac{F}{R_b^2}(G_m^2 - G_n^2)\right] \end{aligned} \tag{13}$$

$$F = -B_2 C_{12} - B_1(C_{12} + C_{11})$$

$$G_i = x_i\cos\theta - y_i\sin\theta$$

The skew value expressed by Expression (13) can be found for all of the combinations of pairs of cores in the cores 10 to 16 of the multicore optical fiber 1. Therefore, the skew value S is found for all of the combinations of pairs of cores in the cores 10 to 16, and attention is focused on a skew value between a pair of cores having a maximum absolute value in the skew values S. In the case in which the multicore optical fiber 1 is bent in a direction at the angle θ, the direction at the angle θ in which the magnitude of the skew value S, on which attention is focused, is a minimum value is defined as a specific bending direction. Thus, the multicore optical fiber 1 is bent in the specific bending direction, allowing a reduction in a skew having the maximum absolute value, and allowing a decrease in the standard deviation of the skew value S. In other words, the multicore optical fiber 1 is bent for use in the specific bending direction, in which a pair of cores has the maximum absolute value of the skew value S and the skew value S of the pair of cores is a minimum value, in, all of the combinations of pairs of cores in the plurality, of cores 10 to 16.

Figure 3:
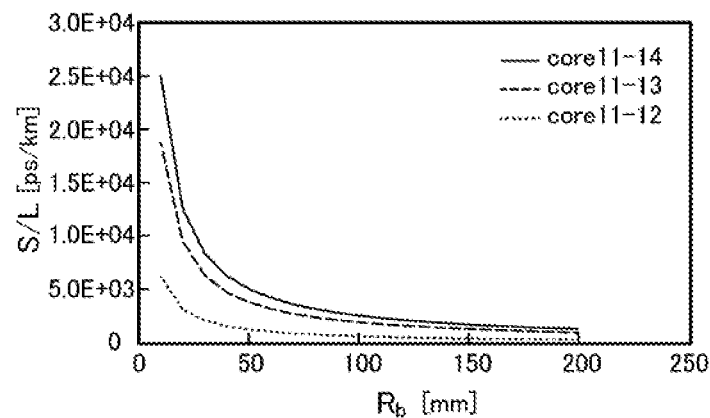
FIG. 3 is a diagram of the relationship between the bending radius of the multicore optical fiber illustrated in FIG. 1, and the skew value, between at pair of cores per unit length.

Subsequently, using Expression (13), the skew value S between pairs of cores of the multicore optical fiber 1 illustrated in FIG. 1 is specifically found. FIG. 3 is a diagram of the relationship between the bending radius of the multicore optical fiber 1 illustrated in FIG. 1 and the skew value S between pairs of cores per unit length. FIG. 3 shows the skew value S between the cores 11 and 14 of the multicore optical fiber 1, the skew value S between the cores 11 and 13, and the skew value S between the cores 11 and 12. Note that, in creating FIG. 3, the bending direction was the x-axis direction, i.e. θ=0. The group refractive indexes $N_{1m}$ and $N_{1n}$ of the pair of cores had the same value. In other words, the skew value S was zero in the case in which the multicore optical fiber 1 was straight. As apparent from FIG. 3, the greater the skew value S is, the smaller the bending radius is, and in a region in which the bending radius is small, the skew value S is suddenly increased. Thus, merely under the conditions in which the group refractive indexes of the cores, i.e. the propagation constants of the cores are merely optimized so as to decrease the skew value when the multicore optical fiber is straight, the skew value is degraded in the case in which the multicore optical fiber is installed being bent. Therefore, as described above, the multicore optical fiber 1 is bent in the direction at the angle θ, in which the skew value S having the maximum absolute value is a minimum value in the skew values S expressed by Expression (13), i.e. the multicore optical fiber 1 is bent in the specific bending direction. Thus, the skew value S can be reduced.

Here, in the multicore optical fiber 1 illustrated in FIG. 1, a multicore optical fiber having only three cores, the core 10, the core 11, and the core 14, is examined.

Figure 4:
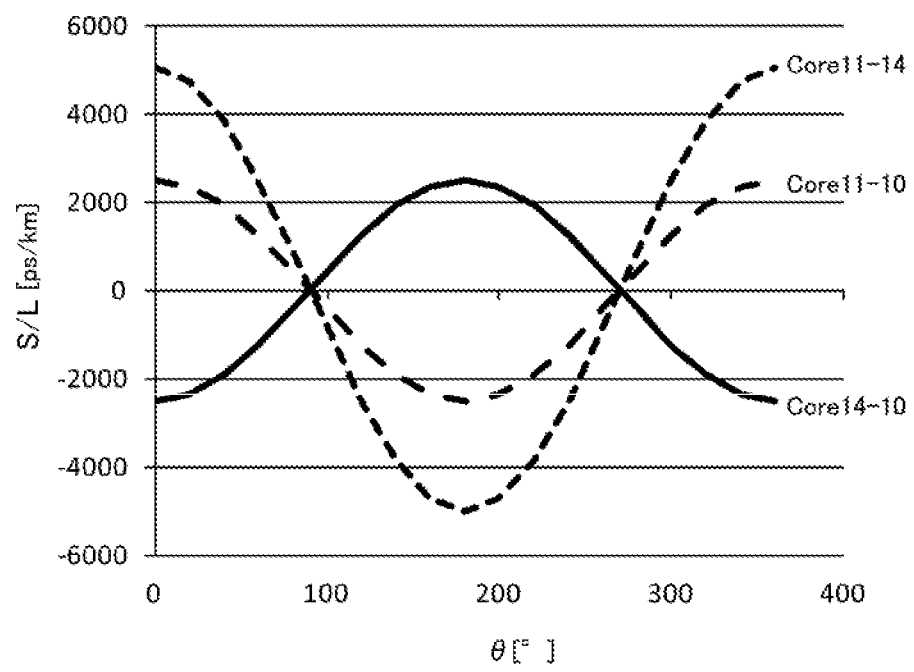
FIG. 4 is a diagram of the relationship between the bending direction of the multicore optical fiber and the skew value per unit length.

FIG. 4 is a diagram of the relationship between the bending direction at the angle θ and the skew value S per unit length in this multicore optical fiber having three cores. Note that, in FIG. 4, the cores have the group refractive index $N_{1m}$, which is the same value. FIG. 4 shows that at the angle θ=90° and 270°, i.e. in the case in which the multicore optical fiber is bent in the y-axis direction, the skew value is zero. Thus, this multicore optical fiber is bent, in the specific bending direction at the angle θ=90° and 270°.

Figure 5:
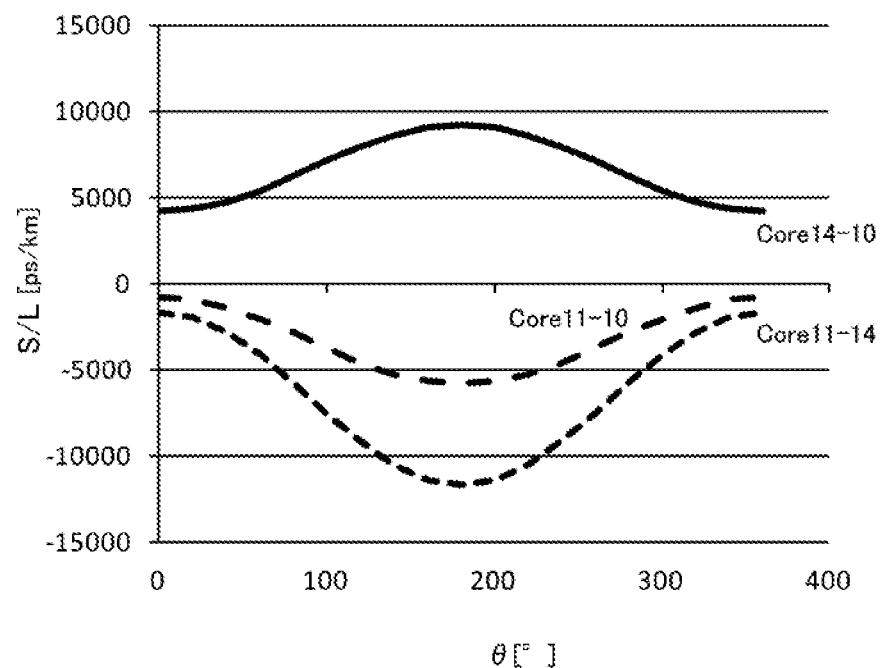
FIG. 5 is a diagram of the relationship between the bending direction and the skew value per unit length in the case in which group refractive indexes of the multicore optical fiber are changed.

FIG. 5 is a diagram of the relationship between the bending direction at the angle θ and the skew value S per unit length in the case in which values of the group refractive indexes $N_{1m}$ are different from each other in the multicore optical fiber having three cores. In the example in FIG. 5, the relation $N_{114} > N_{130} > N_{111}$ is held in the case in which the group refractive index of the core 10 is $N_{110}$, the group refractive index of the core 11 is $N_{111}$, and the group refractive index of the core 14 is $N_{114}$. As illustrated in FIG. 5, in the example, the skew values S have maximum value at the angle θ=180°, and the skew values S have minimum values at the angle θ=0°. In the skew values S, a skew value having the maximum absolute value is the skew between the cores 11 and 14. At the angle θ=0°, the skew value S between the cores 11 and 14 is a minimum value. Thus, the multicore optical fiber in the example is installed being bent in the specific bending direction at the angle θ=0°. Note that, in the example, the other skews also have minimum values at the angle θ=0°.

As described above, in the multicore optical fiber 1 according to the embodiment, a specific bending direction, in which the skew value having the maximum absolute value is a minimum value in the skew values, is found by calculation, and then the multicore optical fiber 1 is bent in the specific bending direction. Thus, the degradation in skew can be reduced. Accordingly, optical communications with small skew can be conducted.

Subsequently, a manufacturing method for the multicore optical fiber 1 will be described.

Figure 6:
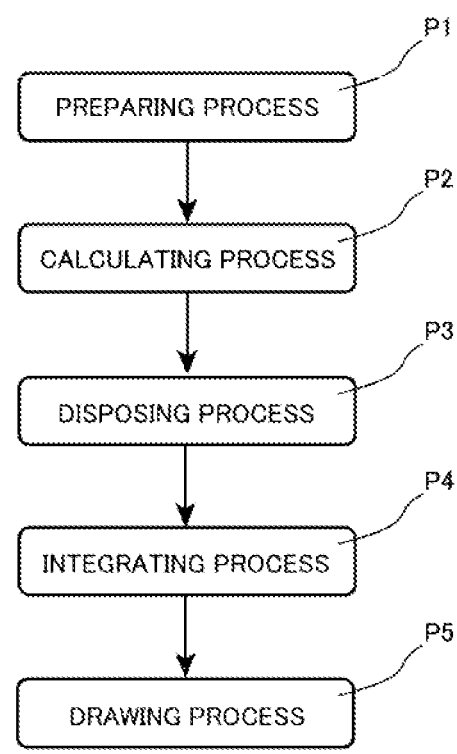
FIG. 6 is a flowchart of processes of fabricating the multicore optical fiber illustrated in FIG. 1.

FIG. 6 is a flowchart of a manufacturing method for the multicore optical fiber 1. As illustrated in FIG. 6, the manufacturing method for the multicore optical fiber 1 includes a preparing process P1, a calculating process P2, a disposing process P3, an integrating process P4, and a drawing process P5, as main processes.

<Preparing Process P1>

Figure 7:
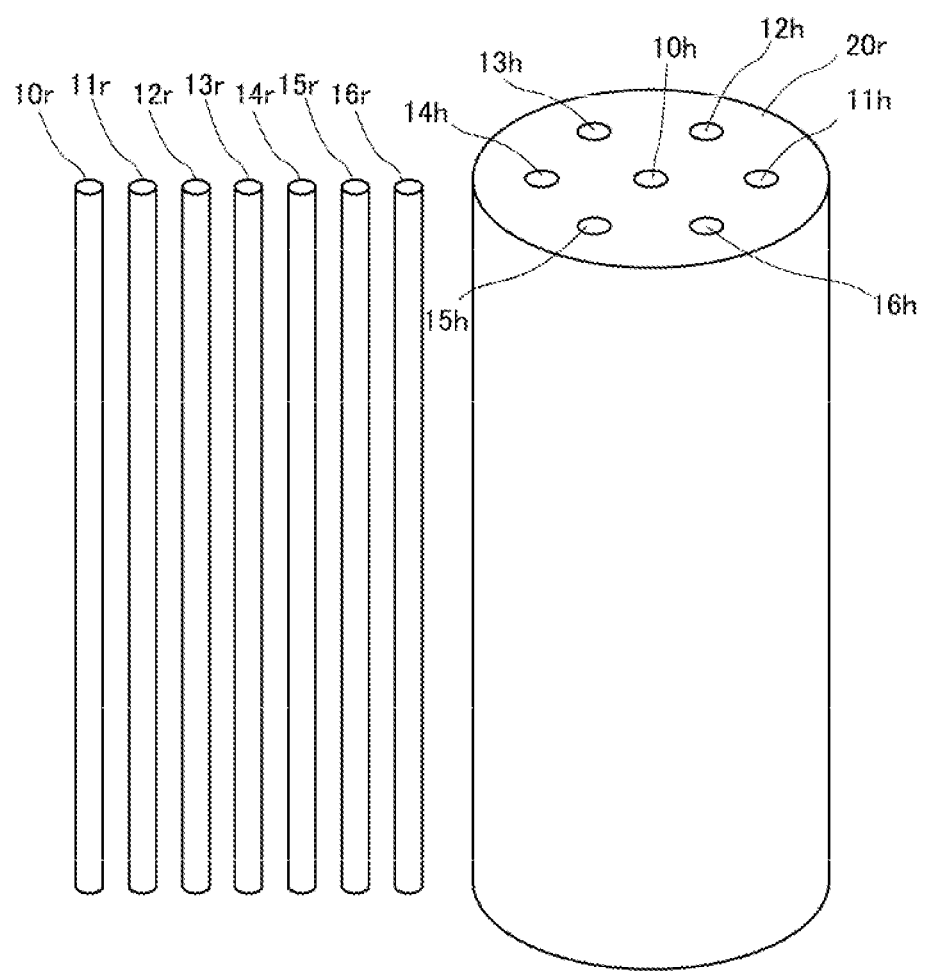
FIG. 7 is a diagram of core rods and a cladding rod prepared in a preparing process.

FIG. 7 is a diagram of core rods and a cladding rod prepared in this process. In the embodiment, the number of the cores of the multicore optical fiber is seven. Thus, seven core rods 10r to 16r are prepared. The core rods 10r to 16r are in a nearly cylindrical columnar shape. The core rods 10r to 16r are to be the cores 10 to 16. Thus, the core rods 10r to 16r are formed of a material similar to the material of the cores 10 to 16. Therefore, in the case in which the refractive indexes of the cores 10 to 16 are different from each other, the refractive indexes of the core rods 10r to 16r are also different from each other. In the case in which the diameters of the cores 10 to 16 are different from each other, the diameters of the core rods 10r to 16r are also different from each other. Note that, the core rods 10r to 16r are covered with a glass film, not illustrated, which is to be a part of the cladding 20.

A cladding rod 20r has a length nearly the same as the length of the core rod, and is in a nearly cylindrical columnar shape. The cladding rod 20r is formed with through holes 10h to 16h, into which the core rods 10r to 16r are inserted. The cladding rod 20r is to be the cladding 20. Thus, the cladding rod 20r is formed of a material similar to the material of the cladding.

<Calculating Process P2>

In this process, the case is assumed in which the prepared core rods 10r to 16r are inserted into the through holes 10h to 16h of the cladding rod 20r to manufacture the multicore optical fiber 1. Using Expression (13), the skew value S between a pair of cores is found. In the process, the skew value S is found for all of the combinations of pairs of cores. Thus, as described above, in the case in which the core rods 10r to 16r are disposed in the through holes 10h to 16h, respectively, to manufacture the multicore optical fiber 1, in all of the combinations of pairs of cores in the plurality of cores 10 to 16, the specific bending direction of the multicore optical fiber 1, in which a pair of cores has the maximum absolute value of the skew value S and the skew value S of the pair of cores is a minimum value, can be grasped on a set of the core rods 10r to 16r and the cladding rod 20r.

The maximum absolute value of the skew value S can be found with the multicore optical fiber being bent in the specific bending direction. In the case in which, this maximum value is large, the position, at which at least a part of the core rods is disposed, may be changed. Specifically, in the case in which the core rods 10r to 16r and the through holes 10h to 16h are in a predetermined combination, the magnitude of the skew value S having a maximum absolute value is found with the multicore optical fiber being bent in the specific bending direction. In the case in which the core rods 10r to 16r and the through holes 10h to 16h are in another combination, the magnitude of the skew value S having a maximum absolute value is found with the multicore optical fiber being bent in the specific bending direction. The combinations of the plurality of core rods $10r$ to $16r$ with the through holes $10h$ to $16h$ are determined in such a manner that, the magnitude of the skew value S is a minimum value in the case in which the multicore optical fiber is bent in a specific direction. Note that, the combinations of the plurality of core rods $10r$ to $16r$ with the through holes $10h$ to $16h$ are not necessarily determined as in the process. However, from the viewpoint of reducing skew, the combinations are preferably determined as described above.

<Disposing Process P3>

Figure 8:
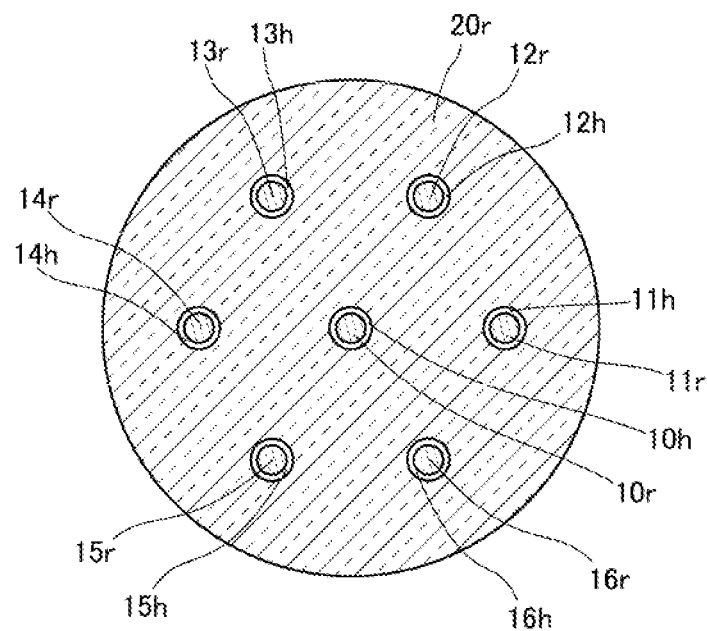
FIG. 8 is a diagram after a disposing process.

FIG. 8 is a diagram after the disposing process P3. As illustrated in FIG. 8, in the process, the core rods $10r$ to $16r$ are inserted into the through holes $10h$ to $16h$ of the cladding rod $20r$, respectively. In the insertion, the core rods $10r$ to $16r$ are preferably inserted into, the through holes $10h$ to $16h$, respectively, based on the combinations of the core rods $10r$ to $16r$ with the through holes $10h$ to $16h$ determined in the calculating process. Thus, the core rods $10r$ to $16r$ are disposed.

<Integrating Process P4>

Figure 9:
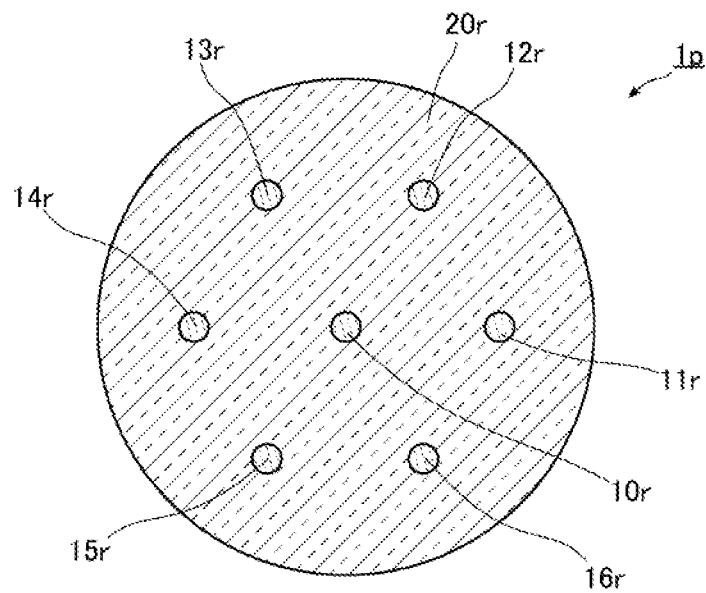
FIG. 9 is a diagram after an integrating process.

FIG. 9 is a diagram after the integrating process P4. As illustrated in FIG. 9, in the process, the set of the cladding rod $20r$ and the core rods $10r$ to $16r$ is heated to integrate the cladding rod $20r$ with the core rods $10r$ to $16r$.

Specifically, the cladding rod $20r$ and the core rods $10r$ to $16r$ inserted into the through holes $10h$ to $16h$ of the cladding rod $20r$ are disposed in a melting furnace for heating. By this heating, the cladding rod $20r$ is contracted to shrink the diameters of the through holes $10h$ to $16h$, and the gaps between the core rods $10r$ to $16r$ and the through holes $10h$ to $16h$ of the cladding rod $20r$ are eliminated. Thus, as illustrated in FIG. 9, the set of the cladding rod $20r$ and the core rods $10r$ to $16r$ is turned into an integrated form, which is a multicore optical fiber preform $1p$. Note that, in the calculating process P2, in the combinations of pairs of cores of the plurality of cores $10$ to $16$, the specific bending direction, in which a pair of cores has the maximum absolute value of the skew value S and the skew value S of the pair of cores is a minimum value, can be grasped in the multicore optical fiber preform $1p$.

<Drawing Process P5>

Figure 10:
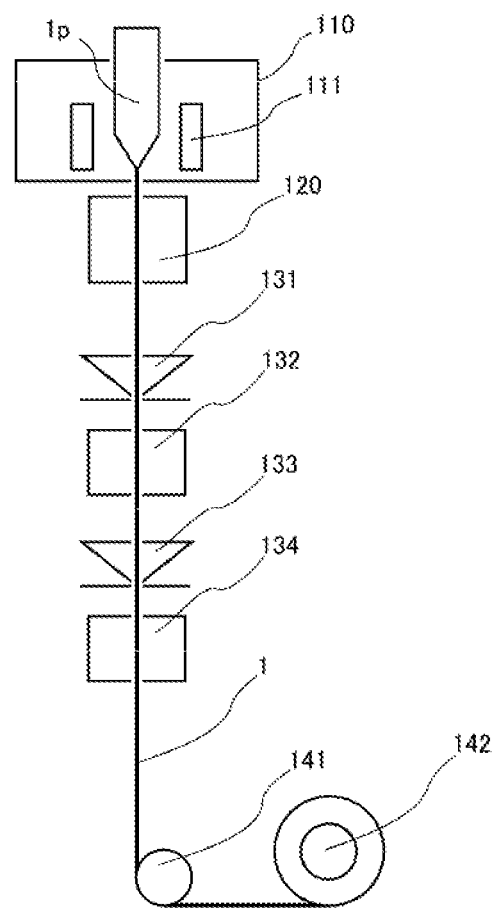
FIG. 10 is a diagram of a drawing process.

FIG. 10 is a diagram of the drawing process P5. First, in the preparation stage for performing the drawing process P5, the multicore optical fiber preform $1p$ formed of the set of the cladding rod $20r$ and the core rods $10r$ to $16r$ is placed in a drawing furnace $110$. At this time, in the calculating process P2, in the combinations of pairs of cores of the plurality of cores $10$ to $16$, the multicore optical fiber preform $1p$ is disposed in the drawing furnace $110$ in such a manner that the specific bending direction, in which a pair of cores has the maximum absolute value of the skew value S and the skew value S of the pair of cores is a minimum value, is directed to a predetermined direction.

Subsequently, a heating unit $111$ of the drawing furnace $110$ is caused to generate heat to heat the multicore optical fiber preform $1p$. In the heating, the lower end of the multicore optical fiber preform $1p$ is heated at a temperature of 2,000° C., for example, and is molten. From the multicore optical fiber preform $1p$, glass is drawn being molten. Upon pulling the molten drawn glass out of the drawing furnace $110$, the drawn glass is hardened, the core rods $10r$ to $16r$ are turned into the cores $10$ to $16$, and the cladding rod $20r$ is turned into the cladding $20$, forming a multicore optical fiber string, which is configured of the plurality of cores $10$ to $16$ and the cladding $20$. After that, the multicore optical fiber string is passed through a cooling device $120$, and cooled to an appropriate temperature. When the multicore optical fiber string is entered to the cooling device $120$, the temperature of the multicore optical fiber string is about 1,800° C., for example. When the multicore optical fiber string is pulled out of the cooling device $120$, the temperature of the multicore optical fiber string is 40 to 50° C., for example.

In the drawing, in the embodiment, the multicore optical fiber string is not twisted. In other words, in the embodiment, glass is drawn with no twist. Thus, the multicore optical fiber string being drawn is not twisted, and the plurality of cores $10$ to $16$ is straight when the cladding $20$ is straight.

The multicore optical fiber string having been pulled out of the cooling device $120$ is passed through a coater $131$ containing an ultraviolet curable resin to be the inner protective layer $31$, and the multicore optical fiber string is coated with this ultraviolet curable resin. The multicore optical fiber string is further passed, through an ultraviolet ray application device $132$ for applying ultraviolet rays to the multicore optical fiber string. This causes the ultraviolet, curable resin to be cured to form the inner protective layer $31$. Subsequently, the multicore optical fiber is passed through a coater $133$ containing an ultraviolet curable resin to be the outer protective layer $32$, and the multicore optical fiber string is coated with this ultraviolet curable resin. The multicore optical fiber string is further passed through an ultraviolet ray application device $134$ for applying ultraviolet rays to the multicore optical fiber string. This causes the ultraviolet, curable resin to be cured to form the outer protective layer $32$, and then the multicore optical fiber $1$ illustrated in FIG. 1 is formed.

A turn pulley $141$ changes the direction of the multicore optical fiber $1$, and the multicore optical fiber $1$ is wound by a reel $142$.

Thus, the multicore optical fiber $1$ illustrated in FIG. 1 is manufactured.

As described above, according to the method for manufacturing a multicore optical fiber of the embodiment, the multicore optical fiber can be manufactured with the specific bending direction grasped, in which, the maximum value of the skew values S is a minimum value. Accordingly, a multicore optical fiber to be manufactured can be easily bent in the specific bending direction, and the degradation in skew can be reduced.

In the process, in the combinations of pairs of cores of the plurality of cores $10$ to $16$, the multicore optical fiber preform $1p$ is disposed in the drawing furnace $110$ in such a manner that the specific bending direction, in which a pair of cores has the maximum absolute value of the skew value S and the skew value S of the pair of cores is a minimum value, is directed to a predetermined direction. Thus, in the multicore optical fiber to be manufactured, the specific bending direction can be easily grasped.

Second Embodiment

Next, referring to FIG. 11, a second embodiment of the present invention will be described in detail. Note that, components the same as or equivalent to ones in the first embodiment are designated the same reference numerals and signs, and the overlapping description is omitted unless otherwise specified.

Figure 11:
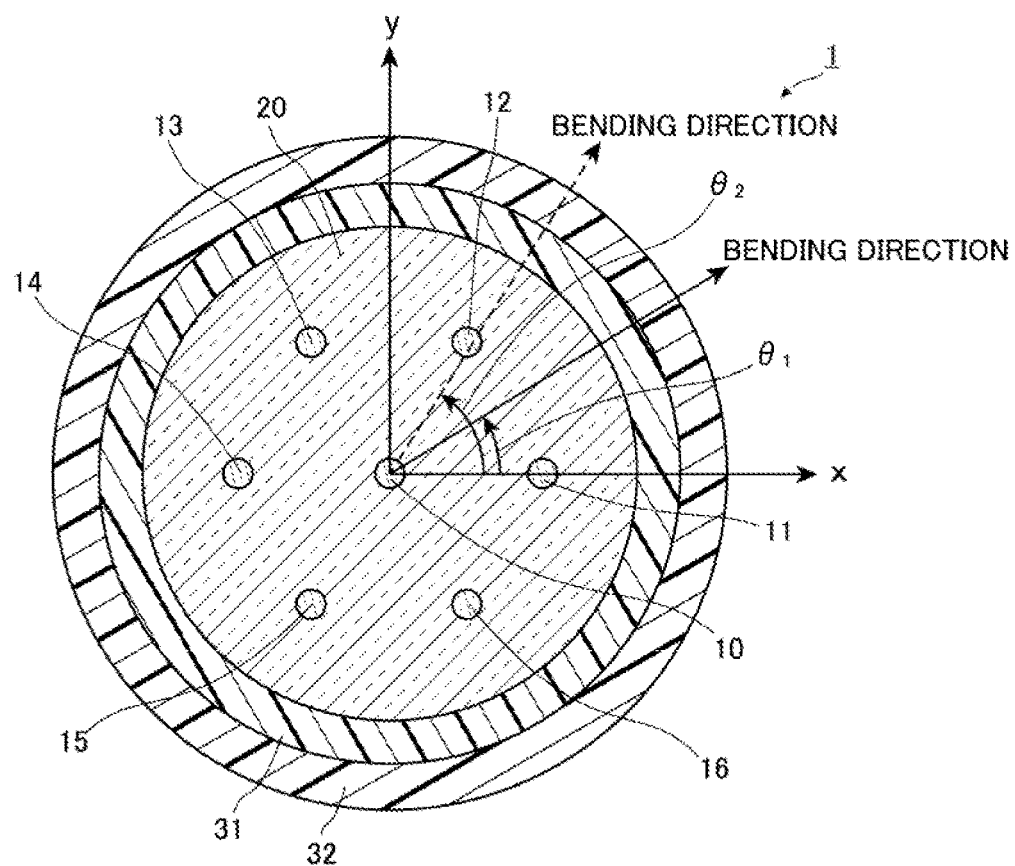
FIG. 11 is a diagram of a multicore optical fiber according to a second embodiment of the present, invention.

FIG. 11 is a diagram of a multicore optical fiber according to the embodiment. The multicore optical fiber according to the embodiment is different from the multicore optical fiber $1$ according to the first embodiment in that the multicore optical fiber according to the embodiment is twisted. Specifically, a multicore optical fiber 1 is twisted in such a manner that a plurality of cores 10 to 16 is continuously and spirally rotated about the center axis of a cladding 20 at an angle in a range of $\theta_1$ to $\theta_2$ without changing the relative position of the plurality of cores 10 to 16, where a relation 0 degrees≤$\theta_1$<$\theta_2$<360 degrees is held. Thus, the multicore optical fiber 1 is repeatedly twisted in one rotation direction and in the other rotation direction at an angle of ($\theta_2-\theta_1$) for every predetermined length.

Here, it is assumed that, the x-axis in the embodiment is an axis extending from the center of the cladding 20 to a predetermined radial direction and on the axis, the relative position of the plurality of cores 10 to 16 is constant, along the longitudinal direction of the cladding 20. In this case, as illustrated in FIG. 11, based on the x- and y-axes, with the twist of the multicore optical fiber 1, the bending direction is changed from a bending direction that forms an angle $\theta_1$ with the x-axis to a bending direction, depicted by a broken line, that forms an angle $\theta_2$ with the x-axis.

In this case, taking into account of twist, Expression (13) can be modified as Expression (14) below, $$S = \frac{L}{c}\left[(N_{1m} - N_{1n}) + \frac{F}{R_b(\theta_2 - \theta_1)}\int_{\theta_1}^{\theta_2}(G_m - G_n)d\theta + \frac{1}{R_b(\theta_2 - \theta_1)}\int_{\theta_1}^{\theta_2}(G_m N_{1m} - G_n N_{1n})d\theta + \frac{F}{R_b^2(\theta_2 - \theta_1)}\int_{\theta_1}^{\theta_2}(G_m^2 - G_n^2)d\theta\right] \quad (14)$$

where the angle $\theta$ holds the relation 0 degrees≤$\theta_1$<$\theta_2$<360 degrees, and the angle $\theta$ is continuously changed at an angle in a range of $\theta_1$ to $\theta_2$.

The skew value expressed by Expression (14) can be found in all of the combinations of pairs of cores in the cores 10 to 16 of the multicore optical fiber 1 according to the embodiment. Therefore, the skew value S is found on all of the combinations of pairs of cores in the cores 10 to 16, and attention is focused on the skew value of a pair of cores having the maximum absolute value in the skew values S. In the case in which the multicore optical fiber 1 is bent, a direction, in which the magnitude of the skew value S, on which attention is focused, is a minimum value, is defined as a specific bending direction. This is nothing other than finding the angles $\theta_1$ and $\theta_2$f at which the magnitude of the skew value S, on which attention is focused, is a minimum value after determining the relative position between the x-axis and the cores 10 to 16. The multicore optical fiber 1 is bent in the specific bending direction thus found, allowing a reduction in a skew having the maximum absolute value, and allowing a decrease in the standard deviation of the skew value S. In other words, also in the embodiment, the multicore optical fiber 1 is bent in the specific bending direction for use in which a pair of cores has the maximum absolute value of the skew value S and the skew value S of the pair of cores is a minimum value in all of the combinations of pairs of cores in the plurality of cores 10 to 16.

The following is a method for manufacturing the multicore optical fiber 1 as described above.

In other words, in the calculating process P2 of the first embodiment, the case is assumed in which the prepared core rods 10r to 16r are inserted into the through holes 10h to 16h of the cladding rod 20r to manufacture the multicore optical fiber 1. In the assumption, a premise is that the preform is continuously twisted at an angle in a range of $\theta_1$ to $\theta_2$ to manufacture the multicore optical fiber 1. The skew value S between a pair of cores is found using Expression (14) above. Also in the process of the embodiment, the skew value S is found for all of the combinations of pairs of cores. Thus, in the case in which the multicore optical fiber 1 is manufactured being twisted, in all of the combinations of pairs of cores in the plurality of cores 10 to 16, the specific bending direction of the multicore optical fiber 1, in which a pair of cores has the maximum absolute value of the skew value S and the skew value S of the pair of cores is a minimum value, can be grasped on a set of the core rods 10r to 16r and the cladding rod 20r.

Similarly to the case of the first embodiment, the maximum absolute value of the skew value S can be found with the multicore optical fiber being bent in the specific bending direction. Thus, the combinations of the plurality of core rods 10r to 16r with the through holes 10h to 16h may be determined in such a manner that the magnitude of the skew value S is a minimum value in the case in which the multicore optical fiber is bent in a specific direction by changing the position, at which at least a part of the core rods is disposed, suitable for the maximum value.

A twist angle ($\theta_2-\theta_1$) may be determined so as to decrease the maximum absolute value, of the skew value S with the multicore optical fiber being bent in the specific bending direction.

In the drawing process P5 of the first, embodiment, the preform is drawn while continuously twisting the multicore optical fiber string at the angle ($\theta_2-\theta_1$). Thus, as illustrated in FIG. 11, the multicore optical fiber 1 is obtained in which the multicore optical fiber 1 is twisted in such a manner that the plurality of cores 10 to 16 is continuously and spirally rotated about the center axis of the cladding 20 at the angle ($\theta_2-\theta_1$).

As described above, the present invention is described as the embodiments are taken as examples. However, the present invention is not limited to these embodiments.

For example, the number and disposition of the cores are not limited to ones in the foregoing embodiments, which can be appropriately changed. In the following, exemplary modifications of the foregoing embodiments are shown. Note that, in describing the exemplary modifications below, components the same as or equivalent to ones of the foregoing embodiments are designated the same reference numerals and signs, and the overlapping description is omitted unless otherwise specified.

Figure 12:
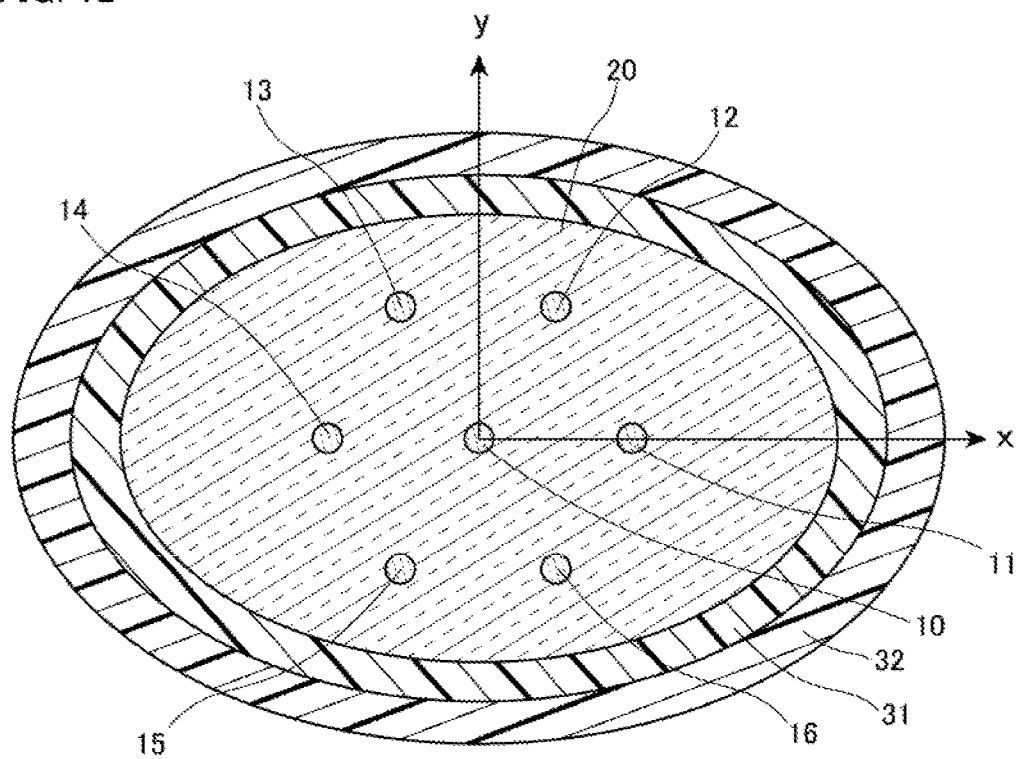
FIG. 12 is a diagram of a multicore optical fiber that is easily bent in a specific bending direction.

As illustrated in FIG. 1, the cross sectional shape of the multicore optical fiber 1 according to the embodiment is a circular shape in the cladding 20, the inner protective layer 31, and the outer protective layer 32. Thus, the multicore optical fiber 1 is similarly easily bent even through the multicore optical fiber 1 is bent in any directions. However, the multicore optical fiber 1 preferably has a configuration in which the multicore optical fiber 1 is easily bent in a specific bending direction, in which a pair of cores has the maximum absolute value of the skew value S and the skew value S of the pair of cores is a minimum value, FIG. 12 is a diagram of a multicore optical fiber that is easily bent in a specific bending direction as described above. As illustrated in FIG. 12, a multicore optical fiber according to the exemplary modification is different from the multicore optical fiber 1 according to the first embodiment in that a cladding 20, an inner protective layer 31, and an outer protective layer 32 are in an ellipse. In the embodiment, it is assumed that the minor axis direction of the ellipse, i.e. the y-axis direction in FIG. 12 is a specific bending direction, in which a pair of cores has the maximum absolute value of the skew value S and the skew value S of the pair of cores is a minimum value. In this case, the minor axis direction is matched with the specific bending direction. Thus, the multicore optical fiber is easily bent in the specific bending direction. Accordingly, according to the multicore optical fiber of the exemplary modification, the multicore optical fiber can be appropriately bent in the specific bending direction without so much paying attention to the specific bending direction. Note that, in the case of the exemplary modification, it is preferable not to distort the multicore optical fiber as in the second embodiment.

Figure 13:
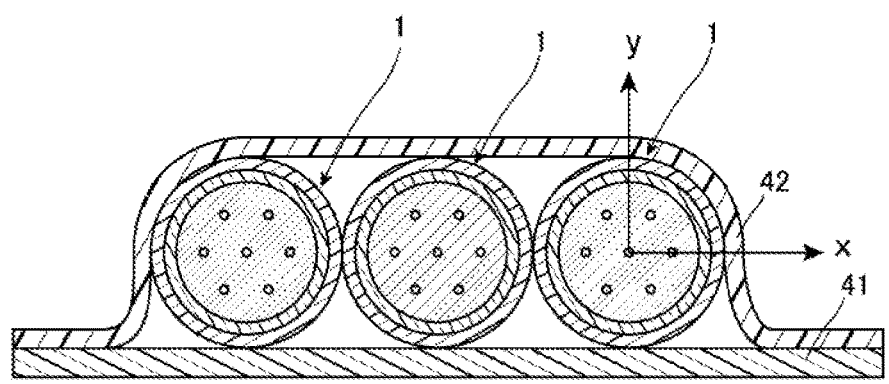
FIG. 13 is a diagram of an exemplary multicore optical fiber ribbon.
Figure 14:
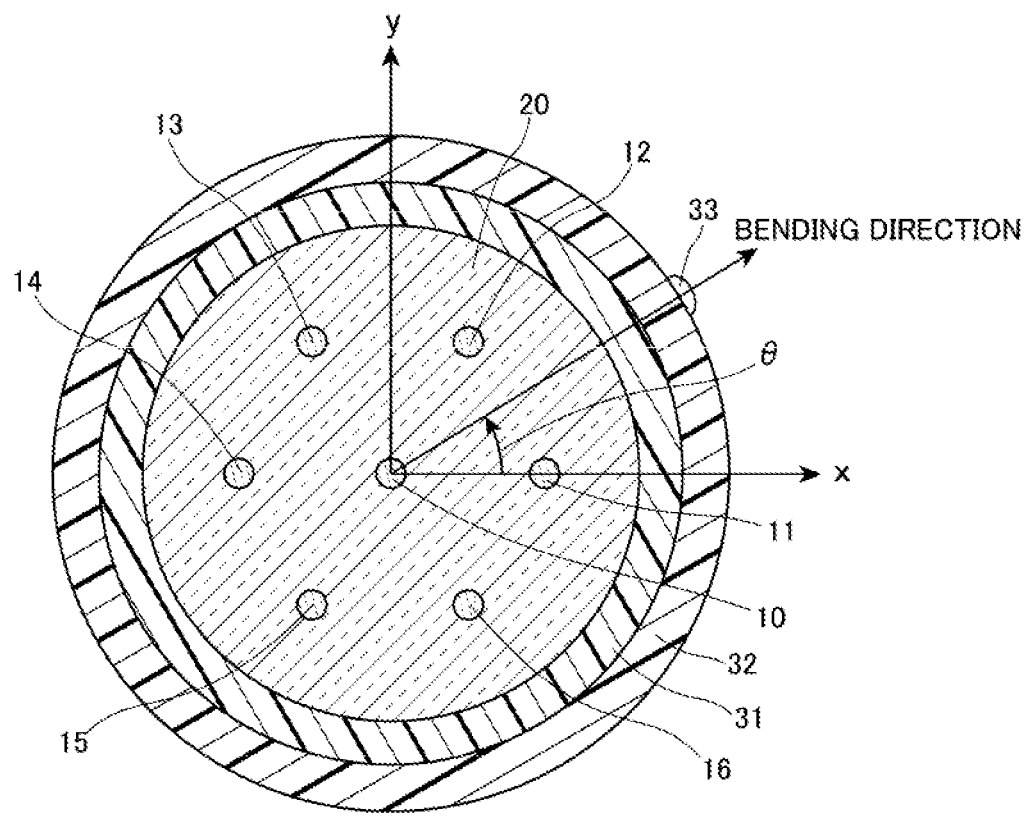
FIG. 14 is a diagram of a multicore optical fiber having a mark in a specific bending direction.

As described above, for a configuration in which the multicore optical fiber can be appropriately bent in the specific bending direction, an optical fiber ribbon can also be formed, FIG. 13 is a diagram of an exemplary multicore optical fiber ribbon. The multicore optical fiber ribbon illustrated in FIG. 13 includes a plurality of multicore optical fibers 1 according to the first embodiment disposed on a base material 41 and bundled with a tape 42. By the actions of the base material 41 and the tape 42, the multicore optical fibers 1 are easily bent in the y-axis direction. Thus, in the multicore optical fibers 1, the specific bending direction, in which in all of the combinations of pairs of coxes in the plurality of cores, a pair of cores has the maximum absolute value of the skew value S and the skew value S of the pair of cores of is a minimum value, only has to be the y-axis direction. Also with this configuration, the multicore optical fiber 1 can be easily bent in the specific bending direction.

The multicore optical fiber easily bent in a specific bending direction includes configurations in which a steel wire is provided in the protective layer, and in which the cross sectional shape of the cladding is in a D-shape.

A mark that, is externally visually recognizable may be provided in the specific bending direction. FIG. 13 is a diagram of an exemplary modification of the multicore optical fiber 1 to which a mark is additionally provided in the specific bending direction. It is assumed that the specific bending direction, in which a pair of cores has the maximum absolute value of the skew value S and the skew value S of the pair of cores is a minimum value, is a direction expressed by the angle θ in FIG. 13. In this case, a mark 33 indicating the specific bending direction is additionally provided on the outer circumferential surface of the outer protective layer 32. Thus, a user of the multicore optical fiber can easily bend the multicore optical fiber in the specific bending direction. Moreover, the multicore optical fiber is easily handled, because the multicore optical fiber is visually recognizable in installing the multicore optical fiber.

Figure 15:
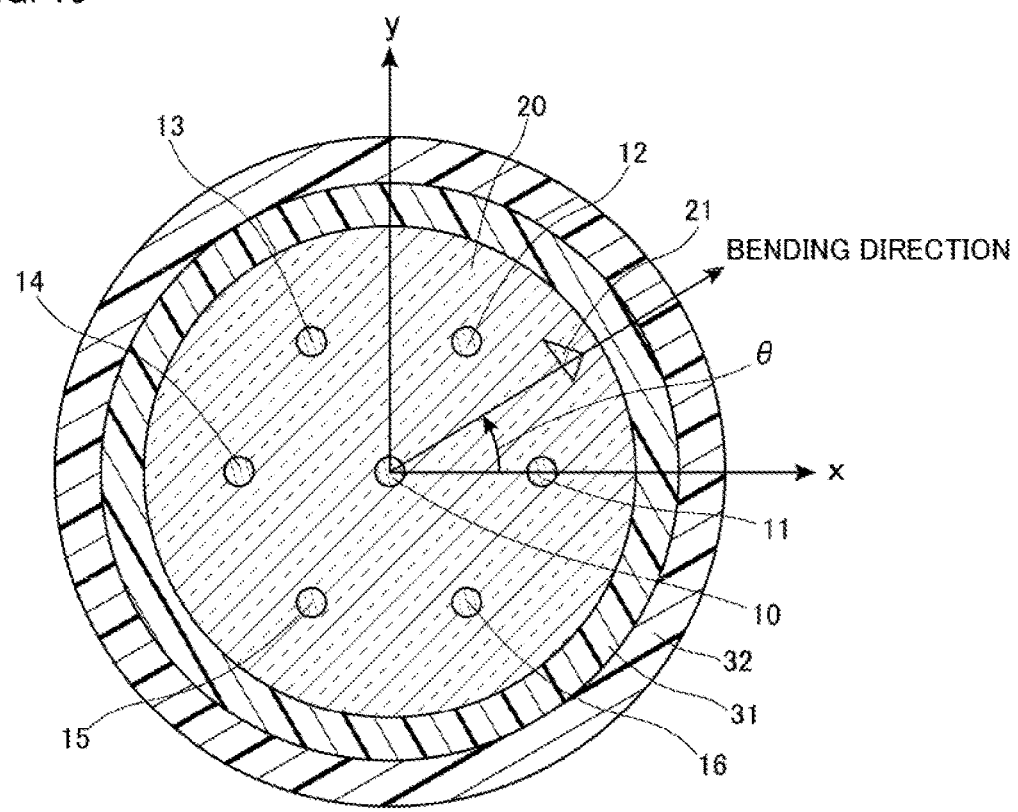
FIG. 15 is a diagram of a multicore optical fiber having a marker in a specific bending direction.

Such a mark can be additionally provided on places other than the place on the outer side of the multicore optical fiber. FIG. 15 is a diagram of a multicore optical fiber additionally provided with a marker in the specific bending direction. Also in the multicore optical fiber in FIG. 15, it is assumed that the direction shown in the exemplary modification in FIG. 13 is the specific bending direction. In this example, a marker 21 having a refractive index different from the refractive index of the cladding is disposed on the inner side of the outer circumferential surface of the cladding 20 in the specific bending direction based on the center of the cladding 20. In order to dispose the marker 21 as described above, in the disposing process P3, a marker having a refractive index different from the refractive index of the cladding 20 only has to be disposed in the specific bending direction based on the center of the cladding rod 20r in such a manner that the maker is surrounded by the cladding rod 20r.

In the manufacturing method for the multicore optical fiber 1 in the foregoing embodiments, the configuration is provided in which the plurality of through holes 10h to 16h is formed on the cladding rod 20r. For example, a configuration may be possible in which instead of the cladding rod 20r, a cladding tube to be a part of the cladding 20 and a plurality of cladding rods to be other parts of the cladding 20 are prepared, and the core rods 10r to 16r and the plurality of cladding rods are disposed in the through hole of the cladding tube and integrated with each other.

In the foregoing embodiments, the integrating process P4 is included. However, a configuration may be possible in which the integrating process P4 is omitted, i.e., the core rods 10r to 16r are not integrated with the cladding rod 20r, the drawing process P5 is performed with the core rods 10r to 16r inserted into the through holes 10h to 16h of the cladding rod 20r, and then a set of the core rods 10r to 16r and the cladding rod 20r is used as a multicore optical fiber preform for drawing, while integrating the core rods 10r to 16r with the cladding rod 20r.

EXAMPLE

In the following the present invention will be described more in detail using an example. However, the present invention is not limited to the example below.

Figure 16:
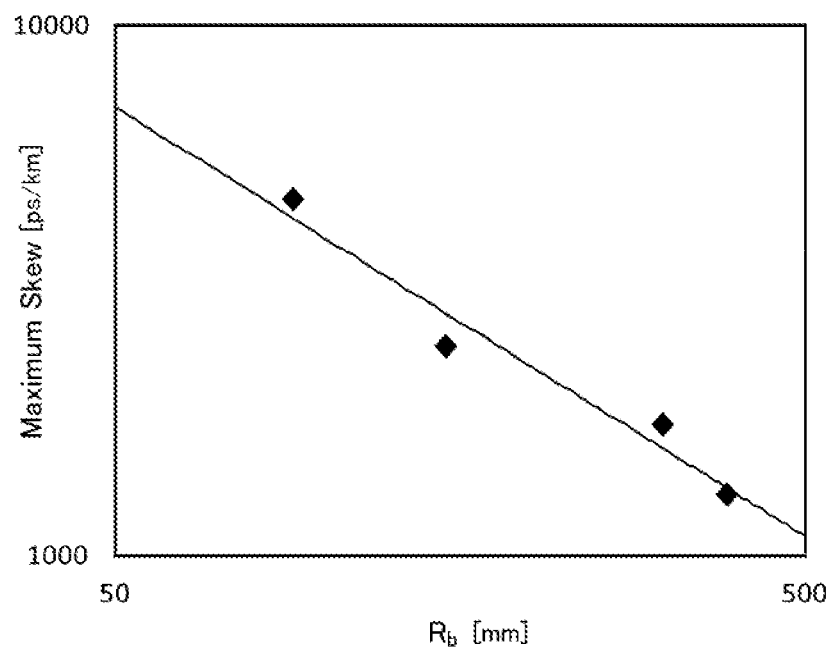
FIG. 16 is a diagram of the relationship between the bending diameter and the skew value.

The multicore optical fiber 1 illustrated in FIG. 1 was fabricated. The length of the multicore optical fiber 1 was 200 m, and the multicore optical fiber was not twisted. In all of the combinations of pairs of cores in the plurality of cores 10 to 16, the skew value S of a pair of cores was measured. The pair of cores had the maximum absolute value of the skew value S. In the measurement, the multicore optical fiber 1 was bent in a specific bending direction, in which the skew value S was a minimum value, and skew values S were measured for bending diameters. FIG. 16 shows the result. As illustrated in FIG. 16, from the confirmation, the skew value S depends on the bending diameter.

Figure 17:
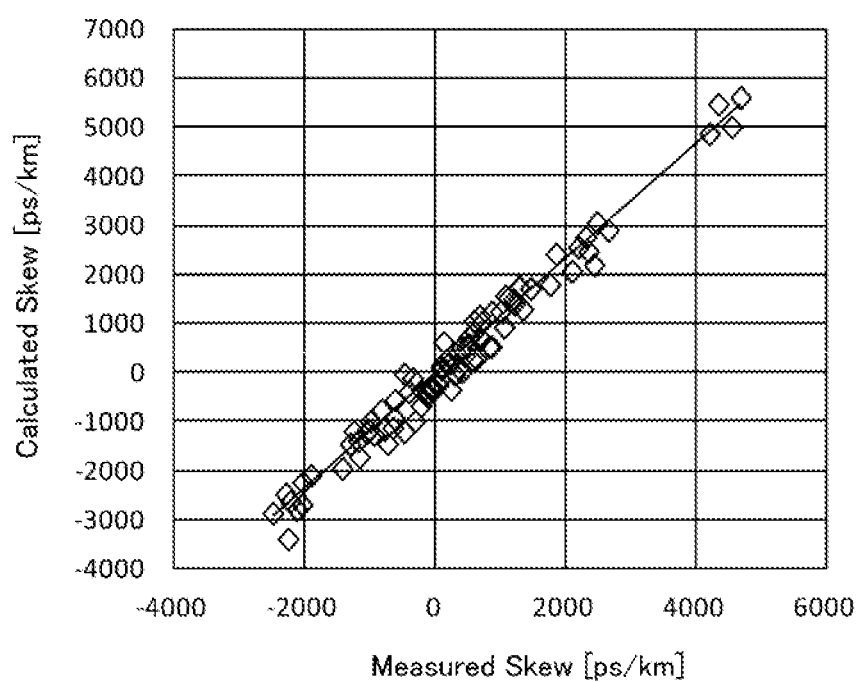
FIG. 17 is a diagram of of the consistency between theoretical skew values and skew values actually measured.

Subsequently, it was confirmed whether the skew value S found by Expression (13) is matched with the skew value actually measured. In FIG. 17, for the skew values of all of the combinations of the cores, a skew value found by Expression (13) and a skew value actually measured of each pair are plotted at one point, the horizontal axis expresses actually measured values, and the vertical axis expresses skew values by calculation. The multicore optical fiber here was not twisted in the entire length, and was bendable in a given direction at the angle θ. The bending diameter R was compared on the diameter R=45, 75, 155, and 192 mm. FIG. 17 shows the result. As illustrated in FIG. 17, the result was obtained in which the skew values S found by Expression (13) are matched with the skew values actually measured.

As described above, according to the present invention, there are provided a multicore optical fiber and a method for manufacturing a multicore optical fiber that can reduce the degradation in skew even in the case in which the multicore optical fiber is nonlinearly installed, which can be used in the field of optical communications.

REFERENCE SIGNS LIST

1 . . . multicore optical fiber
10 to 16 . . . core
20 . . . cladding
21 . . . marker
33 . . . mark

The invention claimed is:

1. A multicore optical fiber comprising:
a plurality of cores; and
a cladding surrounding outer circumferential surfaces of the cores, wherein
the plurality of cores is straight when the cladding is straight,
in the plurality of cores, a skew value S for each pair of cores is expressed by an expression below,
the multicore optical fiber includes a specific pair of cores having a maximum absolute value of the skew value S among the skew values of all of combinations of the pairs of cores in the plurality of cores, the absolute value of the skew value S of the specific pair of the cores decreasing according to a bending direction of the multicore fiber, and
the multicore optical fiber is bent in a specific bending direction such that the absolute value of the skew value S of the specific pair of cores decreases to a minimum value, $$S = \frac{L}{c}\left[(N_{1m} - N_{1n}) + \frac{F}{R_b}(G_m - G_n) + \frac{1}{R_b}(G_m N_{1m} - G_n N_{1n}) + \frac{F}{R_b^2}(G_m^2 - G_n^2)\right]$$

$$F = -B_2 C_{12} - B_1(C_{12} + C_{11})$$

$$G_i = x_i \cos\theta - y_i \sin\theta$$

$$C_{11} = E(1 - v)/[(1 + v)(1 - 2v)]$$

$$C_{12} = Ev/[(1 + v)(1 - 2v)]$$

where, i is m or n, and when an axis from a center of the cladding in a predetermined radial direction is defined as an x-axis and a radial direction orthogonal to the x-axis is defined as a y-axis, θ is an angle formed by a bending direction and the x-axis, $(x_m, y_m)$ are coordinates of a first core of the pair of cores, $(x_n, y_n)$ are coordinates of a second core of the pair of cores, L is a length of the multicore optical fiber, c is a velocity of light in a vacuum, $N_{1m}$, is a group refractive index of the first core of the pair of cores, $N_{1n}$ is a group refractive index of the second core of the pair of cores, $R_b$ is a bending radius, $B_1$ is a photoelastic coefficient of the core to an ordinary ray, $B_2$ is a photoelastic coefficient of the core to an extraordinary ray, E is Young's modulus of core, and v is Poisson's ratio of core.

2. The multicore optical fiber according to claim 1, wherein
the multicore optical fiber is easily bent in the specific bending direction.

3. The multicore optical fiber according to claim 1, further comprises a mark indicating the specific bending direction in which the multicore optical fiber is bent, the mark being provided in the specific bending direction.

4. The multicore optical fiber according to claim 3, wherein
the mark is located in the cladding, and is a marker having a refractive index different from a refractive index of the cladding.

* * * * *